July 3, 1962
B. H. ROWE
3,042,364
SEALING MECHANISM
Filed Dec. 12, 1960
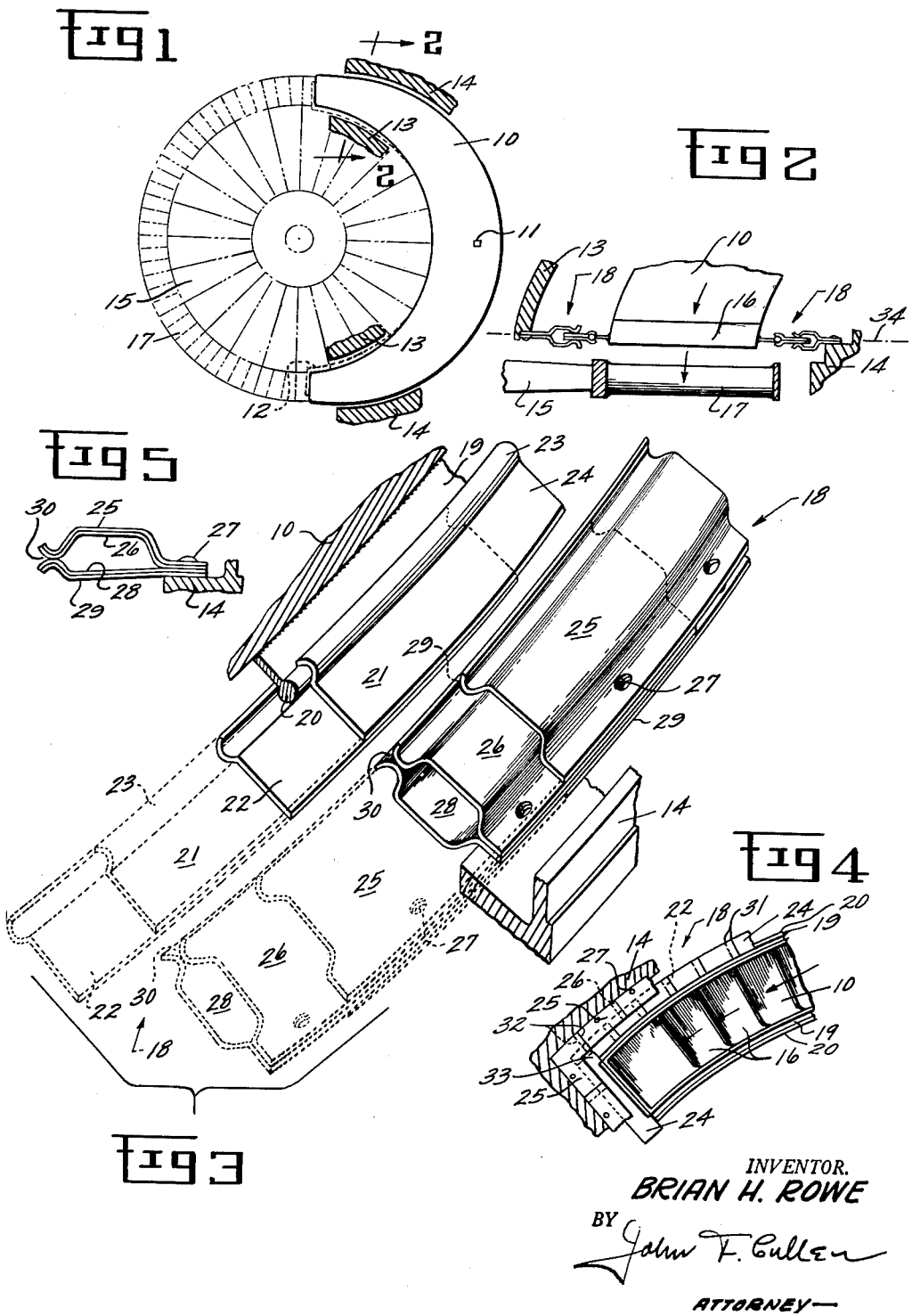
INVENTOR.
BRIAN H. ROWE
BY John F. Cullen
ATTORNEY

United States Patent Office 3,042,364
Patented July 3, 1962

3,042,364
SEALING MECHANISM
Brian H. Rowe, Cincinnati, Ohio, assignor to General Electric Company, a corporation of New York
Filed Dec. 12, 1960, Ser. No. 75,250
8 Claims. (Cl. 253—39)

This invention relates to a sealing mechanism and, more particularly, to a sealing mechanism forming part of a tip turbine fan such as may be used in a VTO type powerplant.

In present day VTO—vertical take-off—aircraft, one of the general arrangements receiving favorable consideration is the fan-in-wing or fan-in-fuselage type wherein a large fan or fans may be vertically mounted in a frame, be it fuselage or wing, for the movement of large quantities of air therethrough to obtain vertical lift. The fan is usually driven by a gas generator which supplies its products of combustion to an annular scroll surrounding the fan which, in turn, directs the exhaust gases through a nozzle to turbine buckets mounted on the ends of the fan and the exhaust and air are directed downwardly to produce lift.

In such arrangements, it becomes important to provide sealing means between the scroll and the supporting frame members. Under the action of the exhaust gas the scroll can expand in three planes, i.e. radially, vertically, and tangentially. The supporting frame members, being out of the exhaust gas stream, are relatively cold compared to the scroll since they are generally subjected to ambient temperature conditions. In addition, the frame members form part of the wing structure or fuselage structure and it is important that the hot exhaust does not come in contact with these portions of the aircraft where it would seriously damage them. In addition, it is important that the exhaust gases be confined to their passage through the turbine blades so that all energy may be extracted from the gases. Obviously, leakage of cold gas or air into the exhaust stream by suction from the space between the frame members and the scroll would lower the efficiency of the turbine. Conversely, loss of the exhaust gas to the space between the frame members and scroll would result in a loss of pressure in the exhaust gas which is part of the energy extracted by the turbine.

Accordingly, it is the main object of the present invention to provide a novel sealing mechanism for such an application which prevents this loss of efficiency and adequately seals between the scroll and frame members.

A further object is to provide such a sealing mechanism which is composed of light weight parts and has a high sealing efficiency.

Another object is to provide such a sealing mechanism which is extremely flexible to provide positive sealing under movements of the scroll in three planes and still maintain the seals in a substantially common plane relation.

Briefly stated, the invention provides a sealing mechanism between the scroll and frame members which comprises contiguous flanges on each side of the scroll extending toward the frames. Each flange has a hinge or bead on its outer edge to provide a pivot for a mating member. The mating member is formed of a pair of plates, each plate having an enlarged portion to grasp the bead and extending in a tongue or male-like extension toward the frame member. Each plate of the pair of plates is axially offset from the other. A series of such plates nest within one another to form a continuous smooth tongue. Opposing the tongue and secured to the frame members is a second set of plates to form a female member extending toward and grasping the tongue in a sealing relation. Again, the female member is made of a series of tangentially or axially offset plates in nesting arrangement to provide a smooth continuous seal with the tongue member. On the ends of the scroll similar sealing means are provided wherein the female member is a continuation of the side female members and the male or tongue member overlaps the side male or tongue members. Further, the seals are arranged in a substantially common plane which, with the pivotal arrangement of the male member and the freedom of movement within the female member, reduces stresses and strains on the parts while forming an effective seal.

While the specification concludes with claims particularly pointing out and distinctly claiming the subject matter which I regard as my invention, it is believed the invention will be better understood from the following description taken in connection with the accompanying drawing in which:

FIGURE 1 is a partial plan view illustrating the scroll and frame members in relation to the fan;

FIGURE 2 is a partial cross-sectional view on line 2—2 of FIGURE 1 showing the relation of the members;

FIGURE 3 is an exploded partial perspective view showing the individual parts of the seal and their offset relation;

FIGURE 4 is a partial plan view illustrating the scroll nozzle and showing the overlapping arrangement of the seal; and FIGURE 5 is a cross-sectional view of a modification of one of the sealing members.

Referring first to FIGURE 1, there is shown a typical arrangement used to provide exhaust gases to a tip turbine fan. The gases are received, from a suitable gas generator by suitable means not shown, by a scroll 10 which may be annular in shape and cross-section. The scroll may be a partial scroll for partial admission thus appearing as a U-shaped member in plan as shown in FIGURE 1. The scroll is supported, in a manner not forming part of this invention, at a fixed point 11 and suitable supporting points along the scroll to permit expansion. The dotted portion 12 illustrates how the scroll can expand radially and tangentially under operation. In addition, it may expand in the vertical direction as well. The whole VTO powerplant is supported in forward and rear continuous frame members 13 and 14 respectively by means not shown.

In order to drive the lift fan 15, the scroll exhausts through a continuous nozzle 16 as seen in FIGURE 2. The fan 15 is driven by turbine buckets 17 mounted on the periphery of the fan 15 in conventional manner. It can also be seen in FIGURE 2 that the vertical movement of the scroll referred to above, is vertical movement in the plane of the drawing.

As thus far explained, it will be seen from FIGURE 2, that exhaust gas expelled from the scroll 10 through nozzles 16 drives turbine buckets 17 which, in turn, power the fan 15 to provide for vertical movement of air therethrough. It can also be seen that scroll 10 as shown in FIGURE 2 is moving under the heat of expansion in all directions whereas frame members 13 and 14 out of the path of the exhaust gases are relatively stationary. It is extremely important that no leakage take place between the frame members and the scroll. Leakage of ambient air between frame members 13 or 14 and scroll 10 into the space between buckets 17 and nozzle 16 seriously lowers the efficiency of the turbine resulting in a loss of energy to the turbine. This leakage may come about by reason of the suction action due to the exhaust of the gases downwardly through scroll 10 and buckets 17, which tends to draw in air from the space between the scroll and the frame members. At different times during operation of the powerplant, the pressure in the vicinity of buckets 17 may be higher than ambient which can result in a leakage of gas out through the aforementioned spaces, again resulting in a loss of efficiency due to loss of pressure.

In order to seal the above mentioned spaces effectively and to allow for the almost universal movement of the scroll, it has been necessary to provide a seal which functions cooperatively with its adjacent members and lends itself effectively to this particular combination or powerplant arrangement.

Since the seals, generally indicated at 18 on each side of the scroll are identical, except for size, it will be necessary to describe only one of the seals in detail.

Referring now to FIGURE 3, in order to mount one of the sealing members, a continuous flange 19 is connected to the scroll 10 and is contiguous therewith throughout its length. The flange 19 thus projects from the side of the scroll toward the frame member 14. For purposes of hinging, flange 19 is provided along its outer edge with bead portion 20 that is larger in diameter than the thickness of flange 19.

Cooperating with the bead portion, there is provided a first pair of flat plates 21, 22, which plates may be light weight sheet metal, and which are axially offset from one another in a tangential direction as seen in FIGURE 3 for a purpose to be described. These plates are secured together by any suitable means such as welding and have formed inner portions 23 grasping the bead 20 lengthwise of the plates to provide a pivotal connection therewith. Thus, the portion 24 forms a flat tongue or male member extending toward frame member 14.

Cooperating with the aforementioned seal member on the scroll 10, is a second pair of U-shaped axially offset plates 25, 26 mounted on the frame member 14 by any suitable means 27. These plates are formed in a U-shape, as may be seen in FIGURE 3, and cooperate with a second corresponding symmetrical pair of axially offset plates 28, 29 which abut with plates 25, 26; all the plates being biased together to form an opening 30 therebetween lengthwise of the plates and directed forward the tongue 24 of the adjacent sealing member. As can be seen in FIGURE 3, the two sealing members are designed to fit together so that the female member on frame 14 firmly grasps tongue 24 within opening 30 in a continuous seal. By the phantom arrangement shown it can be seen that the sealing members are made up of segments which nest within one another due to the offset arrangement of the individual plates. Thus, there is no broken surface presented by the sealing members along the sealing surfaces. Further, as can be seen in FIGURE 3, the joints between the segments of the sealing members in both cases are offset from each other so that the joints do not overlap when the members are together, but each joint falls on the smooth unbroken surface of the opposite member.

It will be appreciated that the term U-shaped has been used to describe plates 25, 26 and 28, 29 whereas only one set of these plates, such as 25, 26 need have an actual U-shape. Thus, the term U-shape is intended to include such obvious equivalents. By the use of the U-shape plates 25, 26 and 28, 29 it can be seen that a tube-like structure parallel to the tongue 24 is provided on frame member 14 to cooperate therewith as previously described.

Referring to FIGURE 5, a cross-sectional view of the modification just mentioned is shown wherein the female member of the seal is formed by U-shaped plates 25 and 26 and substantially flat plates 28 and 29 to form the tube-like member as described above. Therefore, the use of the term U-shaped plates as used in the specification and claims, is intended to connote the tube-like formation of the female member rather than the specific shape of the individual plates themselves.

With the description of the individual seal members as shown in FIGURE 3, the assembly of such members can be seen by reference to FIGURE 4, which is a partial plan view of the sealing structure in the plane of FIGURE 1, showing the overlapping sealing members as applied to the rear frame 14. In this figure, scroll 10 has its pivotally attached flat plates 22, 24 overlapping as shown. These form the tongue extending towards frame member 14 lengthwise of the scroll. These mesh or engage in sealing relation with the mating or female sealing member comprising plates 25, 26 and 28, 29. In this figure it can be clearly seen how the joints 31 of the tongue plates are axially offset from the joints 32 of the matching sealing plate members to provide a smooth sealing surface between the sealing members. It can also be seen how the ends of the tongue members 24 overlap at the end of the scroll at 33 whereas the receiving or female seal 25 forms a continuation of the side tube-like structure shown in FIGURES 3 and 5.

Referring again to FIGURE 2, it can be seen that the seals all lie on a common plane 34 to reduce stresses and this is true even under expansion, i.e. the substantially common plane low stress relationship.

Thus, the seal of the present invention is formed by part of the surrounding structure in the specific embodiment illustrated and claimed and it can be seen that an effective seal is formed between the scroll and frame structure to prevent the leakage of fluid either way.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. Sealing mechanism for a tip turbine fan powerplant comprising, an annular scroll for the passage of exhaust gases and subject to movement in three planes, frame members out of the path of the exhaust gases on each side of the scroll and contiguous therewith, a flange projecting from said scroll on each side lengthwise thereof generally toward said frame members and having a bead on the edge thereof, first plate means forming a tongue pivotally connected to said flange at said bead and extending toward said frame member, second plate means secured to said frame to form a female member extending toward and grasping said tongue in a sealing relation, said plate means lying in substantially a common plane to form a seal between said scroll and frame member.

2. Sealing mechanism for a tip turbine fan powerplant comprising, an annular scroll for the passage of exhaust gases and subject to movement in three planes, frame members out of the path of the exhaust gases on each side of the scroll and contiguous therewith, a flange projecting from said scroll lengthwise thereof on each side of said scroll extending toward said frame members and having a bead on the edge thereof, first plate means forming a tongue pivotally connected to each flange at said bead and extending toward each frame member, second plate means secured to each frame to form a female member extending toward and grasping its mating tongue in a sealing relation, said plate means lying in substantially a common plane to form seals between said scroll and frame members.

3. Sealing mechanism for a tip turbine fan powerplant comprising, an annular scroll for the passage of hot exhaust gases and subject to movement in three planes, frame members out of the path of the exhaust gases on each side of the scroll and contiguous therewith, a flange projecting from each side of said scroll lengthwise thereof generally toward one of said frame members, an enlarged bead portion extending the length of said flange on the edge thereof, a first pair of plates secured together and axially offset from one another, said plates having formed inner portions grasping said bead for pivotal movement thereon, a second pair of U-shaped axially offset plates secured to said frame member with corresponding symmetrical plates abutting to form a tube-like structure, said second and corresponding plates being biased together and having an opening lengthwise thereof toward and clamping said first plates, all said plates lying in substantially a common plane to form a seal between said scroll and frame member.

4. Sealing mechanism for a tip turbine fan powerplant comprising, an annular scroll for the passage of hot exhaust gases and subject to movement in three planes, stationary frame members out of the path of the exhaust gases on each side of the scroll and contiguous therewith, a continuous flange projecting from each side of said scroll lengthwise thereof generally toward said frame members, an enlarged bead portion extending the length of each flange on the edge thereof, a first pair of flat plates secured together and axially offset from one another, said plates having formed inner portions grasping said bead lengthwise of the plates for pivotal movement thereon, the outer portion forming a flat tongue extending away from each side of said scroll, a second pair of U-shaped axially offset plates mounted on each frame member with corresponding symmetrical plates abutting to form a tube-like structure parallel to said tongue, said second and corresponding plates being biased together and having an opening lengthwise thereof toward and clamping said tongue, all said plates lying in substantially a common plane to form a seal between said scroll and frame members.

5. Apparatus as described in claim 4 wherein a plurality of pairs of plates extend the full length of said scroll, each said pairs of plates resting in the offset portion of the adjacent pair to form a continuous jointed and segmented sealing member.

6. Apparatus as described in claim 5 wherein the segmented sealing member by its nesting arrangement provides a continuous smooth seal clamping surface on said tongue.

7. Apparatus as described in claim 6 wherein the joints between the segments of said tongue are offset from the joints between the segments of said second pair of plates.

8. Apparatus as described in claim 7 wherein the scroll is generally U-shaped in plan and like plate sealing members are provided at the ends of said scroll, said end tongue overlapping said side tongues and said end tube-like structure forming a continuation of said side tube-like structure.

References Cited in the file of this patent

UNITED STATES PATENTS

| | | |
|---|---|---|
| 1,082,886 | Ljungstrom | Dec. 30, 1913 |
| 1,313,648 | Steenstrup | Aug. 19, 1919 |
| 1,740,800 | Wiberg | Dec. 24, 1929 |
| 2,584,899 | McLeod | Feb. 5, 1952 |
| 2,772,069 | Hockert et al. | Nov. 27, 1956 |
| 2,799,473 | Smith et al. | July 16, 1957 |